(12) United States Patent
Raney et al.

(10) Patent No.: US 11,873,446 B2
(45) Date of Patent: Jan. 16, 2024

(54) INJECTION OF NONIONIC SURFACTANTS INTO WELLS FOR INCREASED OIL PRODUCTION

(71) Applicant: Third Wave Production, LLC, Katy, TX (US)

(72) Inventors: Kirk Herbert Raney, Houston, TX (US); Grant Wesley Haddix, Katy, TX (US)

(73) Assignee: Third Wave Production, LLC, Katy, TX (US)

(*) Notice: Subject to any disclaimer, the term of this patent is extended or adjusted under 35 U.S.C. 154(b) by 0 days.

(21) Appl. No.: 17/901,492

(22) Filed: Sep. 1, 2022

(65) Prior Publication Data
US 2023/0101188 A1 Mar. 30, 2023

Related U.S. Application Data

(60) Provisional application No. 63/249,319, filed on Sep. 28, 2021.

(51) Int. Cl.
*E21B 43/34* (2006.01)
*C09K 8/584* (2006.01)

(52) U.S. Cl.
CPC ................... *C09K 8/584* (2013.01)

(58) Field of Classification Search
CPC .......... C09K 8/584; E21B 43/13; E21B 43/34
USPC ....................................... 166/270.1
See application file for complete search history.

(56) References Cited

U.S. PATENT DOCUMENTS

| | | | |
|---|---|---|---|
| 4,018,278 A * | 4/1977 | Shupe | C09K 8/584 166/252.1 |
| 4,194,565 A | 3/1980 | Kalfoglou | |
| 8,573,299 B2 * | 11/2013 | Dwarakanath | C09K 8/58 166/305.1 |
| 8,841,241 B2 | 9/2014 | Weerasooriya et al. | |
| 8,973,668 B2 | 3/2015 | Sanders et al. | |
| 9,790,414 B2 | 10/2017 | Champagne et al. | |
| 10,000,688 B2 | 6/2018 | Barnes et al. | |
| 10,995,260 B2 * | 5/2021 | Piri | C09K 8/584 |
| 2013/0067999 A1 | 3/2013 | Xu et al. | |

(Continued)

OTHER PUBLICATIONS

Bidhendi, Mehrnoosh Moradi, "A Set of Successful Chemical EOR Trials in Permian Basin: Promising Field and Laboratory Results", presented at Unconventional Resources Technology Conference, Denver, Colorado, Jul. 22-24, 2019.

(Continued)

*Primary Examiner* — Zakiya W Bates
*Assistant Examiner* — Ashish K Varma
(74) *Attorney, Agent, or Firm* — Park, Vaughan, Fleming & Dowler LLP; Shane Nelson

(57) ABSTRACT

The present disclosure provides a novel process of using nonionic surfactants in wells at, near, or below their cloud point temperature for increased oil production from reservoir formations. Adjusting the surfactant cloud point temperature to be proximate to the reservoir temperature results in the maximum surface activity of the surfactant, increased adsorption, and better imbibition performance. The nonionic surfactants may be mixed with a solution on surface and then injected into formation brine for spontaneous brine imbibition and crude oil production from oil-wet unconventional reservoir formations.

41 Claims, 5 Drawing Sheets

(56) References Cited

U.S. PATENT DOCUMENTS

| | | | |
|---|---|---|---|
| 2015/0247393 A1 | 9/2015 | Portwood | |
| 2016/0024372 A1 | 1/2016 | Fathi Najafabadi | |
| 2016/0251568 A1 | 9/2016 | Do et al. | |
| 2018/0327651 A1* | 11/2018 | Piri | C09K 8/18 |
| 2021/0087459 A1* | 3/2021 | Patil | C04B 28/02 |

OTHER PUBLICATIONS

Tu, Jiawei, "Experimental and Numerical Study of Shale Oil EOR by Surfactant Additives in Fracturing Fluid", presented at Unconventional Resources Technology Conference, Denver, Colorado, Jul. 22-24, 2019.

Kazempour, Mahdi, "Boosting Oil Recovery in Unconventional Resources Utilizing Wettability Altering Agents: Successful Translation from Laboratory to Field", presented at SPE Improved Oil Recovery Conference, Tulsa, Oklahoma, Apr. 14-18, 2018.

Zhang, Fan, "Upscaling Laboratory Result of Surfactant-Assisted Spontaneous Imbibition to the Field Scale through Scaling Group Analysis, Numerical Simulation, and Discrete Fracture Network Model", presented at SPE Improved Oil Recovery Conference, Tulsa, Oklahoma, Apr. 14-18, 2018.

Alvarez, J.O., "Improving Oil Recovery in Unconventional Liquid Reservoirs by Soaking-Flowback Production Schedule with Surfactant Additives", presented at SPE Liquids-Rich Basins Conference, Midland, Texas, Sep. 13-14, 2017.

Wang, D., "Optimizing Water Chemistry to Improve Oil Recovery from the Middle Bakken Formation", presented at SPE Improved Oil Recovery Conference, Tulsa, Oklahoma, Apr. 11-13, 2016.

Alvarez, J.O., "Wettability Alteration and Spontaneous Imbibition in Unconventional Liquid Reservoirs by Surfactant Additives", Society of Petroleum Engineers, Feb. 2017.

Li, Huina, "Multi-Scale Rock Characterization and Modeling for Surfactant EOR in the Bakken", presented at SPE/CSUR Unconventional Resources Conference, Calgary, Alberta, Canada, Oct. 20-22, 2015.

Dawson, Matthew, "Designing an Optimized Surfactant Flood in the Bakken", presented at SPE/CSUR Unconventional Resources Conference, Calgary, Alberta, Canada, Oct. 20-22, 2015.

Wang, Dongmei, "Surfactant Formulation Study For Bakken Shale Imbibition", presented at SPE Annual Technical Conference and Exhibition, Denver, Colorado, Oct. 30-Nov. 2, 2011.

Alvarez, J.O., "The Impact of Surfactant Imbibition and Adsorption for Improving Oil Recovery in the Wolfcamp and Eagle Ford Reservoirs", presented at SPE Annual Technical Conference and Exhibition, San Antonio, Texas, Oct. 9-11, 2017.

Wang, Dongmei, "Wettability Survey in Bakken Shale With Surfactant-Formulation Imbibition", presented at Eighteenth SPE Improved Oil Recovery Symposium, Tulsa, Oklahoma, Apr. 14-18, 2012.

Das, Soumik, "Wettability Alteration of Calcite by Nonionic Surfactants", Langmuir, American Chemical Society, 2018.

Mohanty, Kishore, "Engineered Water for Improvement of Oil Recovery from Fractured Reservoirs", Oil & Natural Gas, 2020 Integrated Review Webinar.

Standnes, Dag C., "Wettability alteration in chalk 2. Mechanism for wettability alternation from oil-wet to water-wet using surfactants", Journal of Petroleum Science and Engineering, Aug. 17, 2000.

W. Chen and D. Schechter, J. of Petroleum Science and Engineering 196 (2021) 107702; "available online Aug. 10, 2020", Elsevier B.V.†

* cited by examiner
† cited by third party

INJECTION OF NONIONIC SURFACTANTS INTO WELLS FOR INCREASED OIL PRODUCTION

This application claims priority to U.S. provisional patent application No. 63/249,319, filed on Sep. 28, 2021, the entire contents of which is incorporated herein by reference.

BACKGROUND OF THE INVENTION

Field of the Invention

The present invention relates to nonionic surfactants, and more particularly to the use of nonionic surfactants in wells near, but below, their cloud point temperature for increased oil production from reservoir formations.

Description of the Related Art

Unconventional shale reservoirs have contributed to a significant portion of oil production in the United States for the last decade. The coupling of hydraulic fracturing and horizontal well has led to intense development in multiple US unconventional reservoirs. During completion treatments, hydraulic fractures interact with existing natural fractures to generate complex high-conductivity fracture networks in tight sandstone, carbonate and shale reservoirs. The multistage hydraulic fracturing revolution substantially enhanced oil production in the US. However, the average ultimate recovery factor is still less than 10% or original oil in place (OOIP). With the significant amount of oil left behind after primary depletion, it is necessary and valuable to apply EOR techniques to improve the ultimate oil recovery.

Enhanced oil recovery (EOR) via the addition of surfactants into the completion fluid techniques has shown great potential to enhance oil recovery in unconventional reservoirs. Similarly, use of surfactants to restimulate unconventional wells provides an economical method to increase and speed-up oil production as compared to drilling new wells or refracking existing wells. Several researchers studied these EOR techniques through laboratory scale experiments and field-scale simulation. Alvarez and Schechter (2017) studied the effectiveness and mechanism of surfactant driven EOR through laboratory-scale experiments. The experimental results showed that surfactant EOR can significantly enhance oil recovery from unconventional core plugs. Zhang et al. (2006) had previously examined the impact of electrolyte concentration, surfactant concentration, and water/oil ratio on wettability alteration of calcite.

Several studies were published about the effectiveness of surfactant in stimulation fluids (Afra et al. 2019a, b; Nguyen et al. 2017; Wang et al. 2016). Saputra and Schechter (2018) investigated the SASI-EOR in the completion process using field scale numerical simulation. Simulation results agreed with experimental data that the surfactant EOR could improve the ultimate oil recovery in ULR. In addition, Zhang et al. (2018a) studied the hybrid EOR technique (combining gas injection EOR with surfactant EOR) on core plugs from unconventional shale reservoirs. Bidhendi et al. (2019) have published their laboratory procedures and field results which led to a successful huff-n-puff surfactant stimulation in the Permian Basin.

Surfactants have a characteristic molecular structure consisting of a hydrophilic head and a hydrophobic tail. Due to this unique structure, surfactants concentrate at boundaries between immiscible phases with the hydrophilic portion of the molecule associating with the hydrophilic phase of the interface and the hydrophobic portion associating with the hydrophobic portion of the interface. In this orientation, surfactants reduce surface and interfacial tension, wet surfaces, produce foam, and facilitate soil removal among many other desirable functions.

Surfactants can be classified by the charge of the hydrophilic portion of their molecule. Anionic surfactants exhibit a negative charge when dissociated in water, cationic surfactants exhibit a positive charge, nonionic surfactants do not ionize in solution, and zwitterionic surfactants carry both a positive and negative charge when dissociated in water.

Nonionic surfactants are utilized in a wide variety of household and industrial applications, including wettability alteration of oil reservoirs. They are relatively inexpensive, low-to-moderate foaming surfactants with excellent wetting and detergency properties. Common nonionic surfactant hydrophobes are primary alcohols, secondary alcohols, Guerbet alcohols, and alkylphenols. These alcohols can be branched or linear in structure.

The most common hydrophile is a chain of ethylene oxide groups which imparts water solubility to the molecule through hydrogen bonding with water. The surfactants are prepared by reacting the appropriate alcohol or alkylphenol with the desired amount of ethylene oxide. The resulting surfactants are called primary alcohol ethoxylates (PAE), secondary alcohol ethoxylates (SAE), Guerbet alcohol ethoxylates (GAE), and alkylphenol ethoxylates (APE). Less common are alkylpolyglucosides (APG) which contain glucose rings instead of ethylene oxide units as the hydrophilic portion. In addition, propylene oxide can be used in place of ethylene oxide by a similar synthesis reaction, but incorporation of propylene oxide reduces rather than raises cloud point temperature. By varying the carbon chain length of the hydrophobic alcohol and the average number of ethylene oxide units in alcohol or alkylphenol ethoxylate molecules, surfactants are produced with maximum effectiveness at different temperatures and water ionic strengths.

Rock surfaces in oil reservoirs can be classified as oil-wet, water-wet, or mixed-wet depending upon on which liquid phase preferentially spreads on the rock surface. This property is usually measured through contact angle (CA) measurements on flat planar rock surfaces. The generally agreed upon boundaries for wettability are water wet when the CA is less than 75°, intermediate wet when the CA is more than 75° and less than 105°, and oil wet if the CA is greater than 105°. Surfactants impact this property by adsorbing on the rock surface and orienting either their hydrophobic or hydrophilic portion away from the solid. The surfactants can also impact wettability by solubilizing hydrophobic compounds that reside on the surface, thereby changing the surface from hydrophobic (oil-wet) to hydrophilic (water-wet).

Existing surfactants and methods of use for increased oil recovery are not satisfactory. Choice of the most appropriate surfactant varies based on many factors, including rock surface chemistry, water and oil composition, surfactant, and temperature. Determining the appropriate surfactant and overall compositions for the fluid injection is challenging, and depends largely on the surrounding rock formation and well conditions. Further, many surfactant molecules, particularly anionic and cationic surfactants, are not suitable for enhancing oil recovery due to their sensitivity to salinity, divalent ions, and/or temperature. At high ionic strengths, many ionic surfactants precipitate from solution and become ineffective for modifying the wettability of rock surfaces. In addition, some surfactant classes are chemically unstable at high temperatures commonly found in deeper oil reservoirs.

Ionic surfactants are often more expensive to produce than nonionic surfactants due to their complex structure and multiple synthesis steps for production.

A need exists for an improved surfactant that is capable of imbibing into reservoir rock matrices of varying geochemistry to produce and maintain a highly water-wet rock surface in the presence of a variety of crude oils of differing oil chemistries. A need exists for an improved surfactant for rock imbibition that is effective at high temperatures and in high ionic strength brines. A need exists for an improved method for selecting, screening, and/or testing surfactants for potential use in unconventional oil and gas wells. A need exists for an improved method for increasing oil recovery and/or production from unconventional oil and gas wells.

SUMMARY OF THE INVENTION

The present disclosure provides a novel process of using nonionic surfactants in wells at, near, or below, their cloud point temperature for increased oil production from reservoir formations. Adjusting the surfactant cloud point temperature to be proximate to the reservoir temperature results in the maximum surface activity of the surfactant, increased adsorption, and better imbibition performance. The nonionic surfactants may be mixed with a solution on surface and then injected into formation brine for spontaneous brine imbibition and crude oil production from oil-wet unconventional reservoir formations.

Disclosed is a method of injecting surfactants into an oil or gas well, comprising injecting a non-ionic surfactant solution into a reservoir formation, wherein the reservoir formation has a reservoir temperature, and wherein the reservoir temperature is at or less than a cloud point temperature of the surfactant solution. The nonionic surfactant solution may comprise one or more non-ionic surfactants and a brine composition. In such an embodiment, the brine composition may comprise a salt composition substantially similar to a salt composition of the formation brine and/or the brine composition may comprise substantially no surfactants. The nonionic surfactant solution may comprise one or more of the following: an ethoxylated nonionic surfactant, a primary alcohol ethoxylate, a secondary alcohol ethoxylate, a Guerbet alcohol ethoxylate, an alkylphenol ethoxylate, an alkylpolyglucoside surfactant, one or more anionic hydrotropes, and one or more nonionic hydrotropes. The nonionic surfactant solution may comprise at least 0.2 wt % surfactant of the injected brine composition, while in other embodiments it may be less than 0.2 wt % surfactant of the injected brine composition, less than 0.5 wt % surfactant of the injected brine composition, greater than 0.5 wt % surfactant of the injected brine composition, or between 0.2 wt % and 0.5 wt % surfactant of the injected brine composition. In some embodiments, the nonionic surfactant solution produces a final contact angle of less than 75 degrees, less than 60 degrees, or less than 45 degrees.

In one embodiment, the injection step produces spontaneous brine imbibition from the reservoir formation. The reservoir formation may comprise an oil-wet unconventional reservoir formation. In one embodiment, the reservoir formation comprises carbonate-rich rock and/or silicate-rich rock. The cloud point temperature may be a cloud point temperature of the surfactant solution in formation brine. In one embodiment, the reservoir temperature is approximately the same as the cloud point temperature. In other embodiments, the reservoir temperature is less than 5 degrees Fahrenheit below the cloud point temperature, is less than 10 degrees Fahrenheit below the cloud point temperature, is less than 20 degrees Fahrenheit below the cloud point temperature, or is less than 50 degrees Fahrenheit below the cloud point temperature.

The disclosed method may further comprise selecting the non-ionic surfactant solution based upon the reservoir temperature. The disclosed method may further comprise determining the reservoir temperature and selecting the non-ionic surfactant solution based upon the determined reservoir temperature. The disclosed method may further comprise creating the non-ionic surfactant solution based upon the reservoir formation. The disclosed method may further comprise injecting the non-ionic surfactant solution into the reservoir formation at a temperature less than the reservoir temperature.

The present disclosure also discloses a method of injecting surfactants into an oil or gas well that comprises injecting a non-ionic surfactant solution into a reservoir formation, wherein the non-ionic surfactant solution comprises one or more non-ionic surfactants and a brine solution, and wherein the reservoir formation has a reservoir temperature, and wherein the reservoir temperature is at or less than a cloud point temperature of the surfactant solution in formation brine, and wherein the nonionic surfactant solution reduces a contact angle between formation brine and reservoir rock from about 105 degrees to below about 75 degrees. In other embodiments, the nonionic surfactant solution reduces a contact angle between formation brine and reservoir rock from above 105° to below 60 degrees, or from above 105 degrees to below 45 degrees. In one embodiment, the contact angle is measured at a given temperature. The reservoir rock may be saturated with oil prior to contact angle measurements. The reservoir rock may be conditioned to simulate reservoir formation conditions prior to contact angle measurements. The reservoir rock may be a restored state sample of a reservoir rock.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1A:
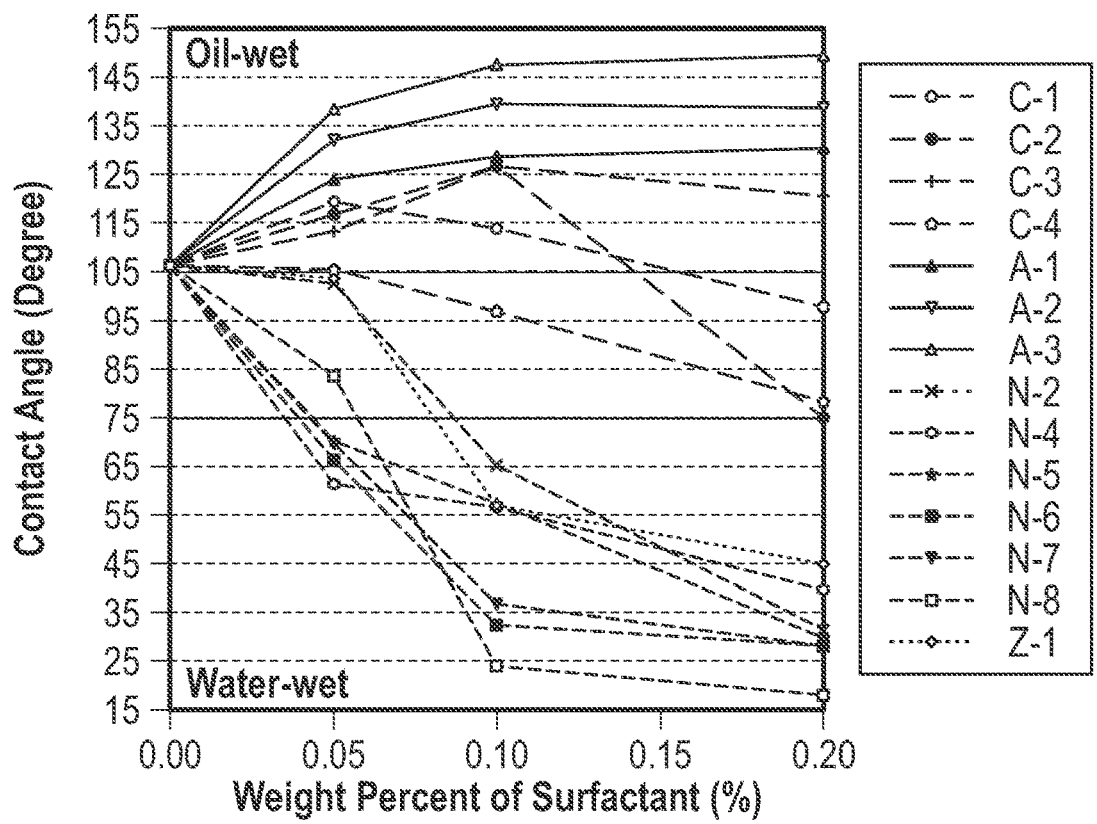
FIGS. 1A-1C illustrate graphs showing contact angle measurements of various surfactants according to one embodiment of the present disclosure.

Various features and advantageous details are explained more fully with reference to the nonlimiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Overview

The present disclosure provides a novel process of utilizing nonionic surfactants in a well at, near, or below their cloud point temperature for increased oil production from reservoir formations. In one embodiment, the nonionic surfactants may be injected into formation brine for spontaneous brine imbibition and crude oil production from oil-wet unconventional reservoir formations. In one embodiment, a huff-n-puff surfactant treatment with the disclosed surfactant may yield enhanced oil recovery over conventional techniques and surfactants. In one embodiment, nonionic surfactants (such as alcohol ethoxylate (AE) nonionic surfactants) are more effective than anionic or cationic surfactants at increasing oil recovery from a carbonate-rich core through imbibition. In one embodiment, maintaining a close proximity of the surfactant cloud point to the reservoir temperature results in the maximum surface activity of the surfactant, increased adsorption, and better imbibition performance. In other words, the use of a nonionic surfactant in a reservoir at a temperature less than the cloud point temperature provides increased oil production benefits. In one embodiment, due to the reduction in solubility of AE surfactants at increasing temperatures and salinity, which can eventually result in phasing out of the surfactant from solution and impeding surfactant mass transfer to the reservoir matrix, the cloud point temperature of the surfactant in reservoir brine is preferred to be higher than the reservoir temperature. In one embodiment, injecting a nonionic surfactant with a sufficiently long EO chain length to achieve a cloud point slightly higher than the well temperature will maximize effectiveness of the surfactant for imbibition into the well and increase oil recovery.

In one embodiment, the injected nonionic surfactant solution will contact the rock matrix soon after injection into the well and will rapidly attain the bottom hole temperature of the well. This is the temperature at which the surfactant solution will imbibe into the rock matrix. This well temperature should be known or approximated prior to injection so that the structure of the injected surfactant can be optimized to allow the proper relationship between cloud point temperature and the reservoir temperature. In other words, one needs to know the temperature of the reservoir (which will be the temperature of the surfactant solution) to properly select and/or formulate the non-ionic surfactant solution to result in the cloud point temperature of the surfactant solution to be at or greater than the temperature of the nonionic surfactant solution. In one embodiment, the temperature of the reservoir is known (such as by a bottom hole temperature measurement) or can be estimated and/or calculated by procedures known to one of skill in the art. In one embodiment, an estimate of the well bottom hole temperature is used for comparison to measured cloud point temperature of various nonionic surfactants in the reservoir brine.

In one embodiment of the present disclosure, the use of nonionic surfactants provides more significant wettability alterations than ionic surfactants. In one embodiment of the present disclosure, the use of nonionic surfactants provides increased oil production for a wide variety of products, including low-TAN crude oil production, black oil crude oil production, highly-paraffinic crude oil production, highly-aromatic crude oil production. Similarly, the crude oil may have different weights, such as being less than 40° API, less than 30° API, less than 25° API and in one embodiment may be approximately 24° API crude oil. In one embodiment, the oil reservoir may have various salinities, as measured by total dissolved solids. For example, the reservoir salinity may be less than 20% reservoir salinity as total dissolved solids, less than 10% reservoir salinity as total dissolved solids, less than 5% reservoir salinity as total dissolved solids, and in one embodiment may be between 5-10% reservoir salinity as total dissolved solids.

Surfactants

Choice of the most appropriate surfactant depends on a particular mineral formation, and must be made given the restrictions imposed by rock surface chemistry, water and oil composition, and temperature. All of these factors affect the ability of the surfactant to alter rock wettability to water wet. This can be challenging as many of these boundary conditions conspire to make formulation difficult. In one embodiment of the present disclosure, the use of nonionic surfactants provides more significant wettability alterations than ionic surfactants.

All nonionic surfactants exhibit a cloud point phenomenon. For the purposes of this disclosure, a cloud point temperature is that temperature above which the surfactant phase separates from the aqueous phase to form a highly concentrated liquid surfactant phase. In one embodiment, as the temperature of a nonionic surfactant solution is increased, intermolecular hydrogen bond strength is exceeded, and the cloud point temperature is eventually reached. The cloud point temperature is reduced at increasing ionic strengths. In one embodiment, optimum nonionic surfactant performance is observed near the cloud point temperature where surfactant adsorption on surfaces and interfaces is thermodynamically favored relative to remaining in the aqueous solution.

In oil reservoir applications, use of nonionic surfactants above their cloud point temperature should be avoided due to inability of the resulting surfactant coacervate phase to efficiently penetrate the porous rock matrix, resulting in inefficient use of injected surfactant molecules that occupy the coacervate phase once the system temperature exceeds the cloud point. In one embodiment, exceeding the cloud point temperature has a negative effect on the effectiveness of surfactant molecules introduced as the equilibrium between adsorbed, free (solvated), and coalesced surfactant molecules tends strongly toward the immiscible coacervate phase.

By careful examination of reservoir conditions, including primarily temperature and water composition, optimal alcohol chain length and ethoxylate chain length of a surfactant can be chosen to maximize surfactant adsorption on the reservoir rock to alter rock wettability while avoiding phase separation of the surfactant within the reservoir. In one embodiment, this may be achieved by utilizing a nonionic surfactant with a cloud point temperature in reservoir brine slightly above the reservoir temperature.

As is known in the art, the cloud point temperature of a surfactant solution changes based on the surfactant utilized, the surfactant concentration within the overall solution, and the composition of the solution itself. In one embodiment, higher surfactant concentrations can slightly increase the cloud point temperature. Many other factors have larger effects on the cloud point temperature. For example, the cloud point temperature is affected by the ionic strength of the aqueous phase, with higher ionic strengths resulting in lower temperatures at which surfactant phase separation occurs. Surfactant structure also impacts the cloud point temperature with shorter alkyl chains and longer ethylene oxide chains resulting in increased water-solubility of the nonionic surfactant and a higher cloud point temperature than that found for more hydrophobic surfactants, e.g., those with longer alkyl chains and shorter ethylene oxide chains. Branching of the alkyl chain while maintaining the same total number of carbon atoms generally results in higher cloud point temperatures. As another example, the proximity of the surfactant temperature to the cloud point temperature can be adjusted through changing the hydrophobe and hydrophile structures of the nonionic surfactant.

In one embodiment for nonionic surfactants with ethylene oxide (EO) units, these units remain hydrated at lower temperatures but dehydrate at elevated temperatures due to reduced hydrogen bonding with water molecules; the dehydration results in the EO chain of the surfactant becoming much more hydrophobic and reduces the solubility of the surfactant in water. In one embodiment, the nonionic surfactant solution comprises an ethoxylated nonionic surfactant. For high reservoir temperatures, e.g., above 180° F., and high salinities, e.g., above 30,000 ppm total dissolved solids, alcohol ethoxylates (AE) and nonylphenol ethoxylates (NPE) with greater than about 20 ethylene oxide groups may be required to maintain solubility of the surfactant in the imbibing liquid. In addition, use of alkyl polyglucoside, an alternative nonionic surfactant class with very high cloud point temperatures in saline solutions, will provide good brine imbibition at extreme conditions. Similarly, addition of anionic or nonionic hydrotropes, i.e., low or no-surface activity chemicals that increase surfactant solubility, to nonionic surfactants will also decrease temperature and electrolyte sensitivity of the surfactant and enhance oil recovery at high reservoir temperatures and/or high reservoir salinities. In general, a wide variety of nonionic surfactants can be utilized with the present disclosure. For example, the nonionic surfactant solution may comprise a primary alcohol ethoxylate, a secondary alcohol ethoxylate, a Guerbet alcohol ethoxylate, an alkylphenol ethoxylate, an alkylpolyglucoside surfactant, and any combinations thereof. The nonionic surfactant solution may comprise one or more anionic hydrotropes or one or more nonionic hydrotropes.

In one embodiment, the nonionic surfactant solution comprises at least 0.2 wt % of the injected brine composition or at least 0.5% wt of the injected brine composition. In other embodiments, the nonionic surfactant solution may be less than 0.2 wt %, less than 0.5 wt %, or between 0.2 wt % and 0.5 wt % of the injected brine composition. In one embodiment, the use of higher surfactant contents may not have a large impact on cloud point temperature, but may lead to more efficient and long-lasting wettability alteration and improved oil recovery.

In one embodiment, the temperature of the injected nonionic surfactant solution in the reservoir is approximately the same as the cloud point temperature. In other embodiments, the temperature of the injected nonionic surfactant solution in the reservoir is less than 5 degrees Fahrenheit below the cloud point temperature. In other embodiments, the temperature of the injected nonionic surfactant solution in the reservoir may be less than 10, 20, or 50 degrees Fahrenheit below the cloud point temperature. In one embodiment, the closer in proximity the injected nonionic surfactant solution is to its cloud point temperature, the higher the surface activity of the surfactant and the more effective it will be at modifying wettability and increasing oil recovery.

Contact Angle

Contact angle (CA) has been shown to be closely related to recovery factor from spontaneous imbibition, as the CA measurement is an indicator of whether the oil reservoir can be classified as oil-wet, water-wet, or mixed-wet. Contact angle is a standard laboratory measurement whereby an oil drop is deposited on the surface of reservoir rock in the presence of bulk aqueous phase. Several drops are deposited on the same surface to reduce the variation and allow determination of a statistical average for contact angle. An optical system is utilized to directly measure the angle of contact of the oil drop adhering to the solid surface in the presence of an aqueous phase. As is known in the art, the measuring device to determine the CA is a goniometer.

In one embodiment, increased oil recovery from a rock requires significant wettability alteration, in particular reducing the water/rock contact angle to below approximately 75° converts the rock surface to a water-wet state. In one embodiment of the present disclosure, the use of nonionic surfactants provides more significant wettability alterations than ionic surfactants. In one embodiment of the present disclosure, the use of nonionic surfactants provides lower contact angles than ionic surfactants. In one embodiment, the contact angle (CA) as measured through the brine phase is highly indicative of the ability to change the water wettability of the rock surface. In other words, determining the CA achieved after the addition of the nonionic surfactant allows one to select the optimum surfactant for maximum oil recovery.

Figure 1B:
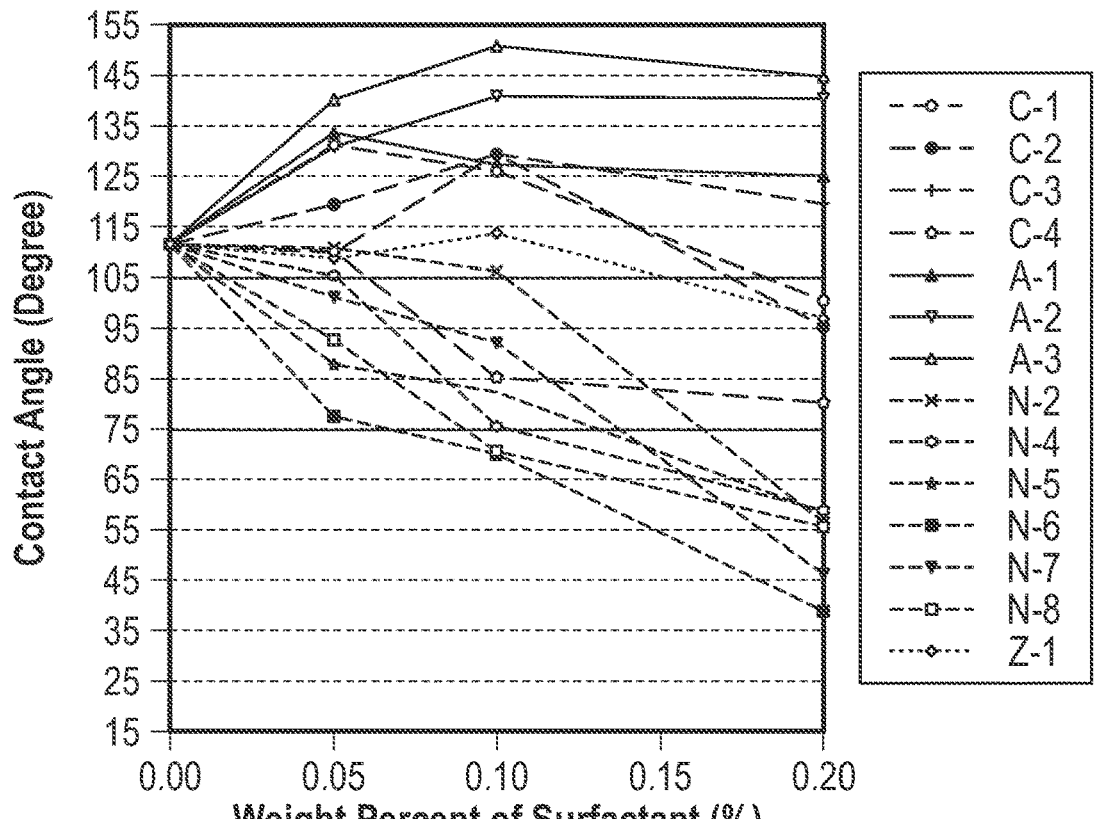
Figure 1C:
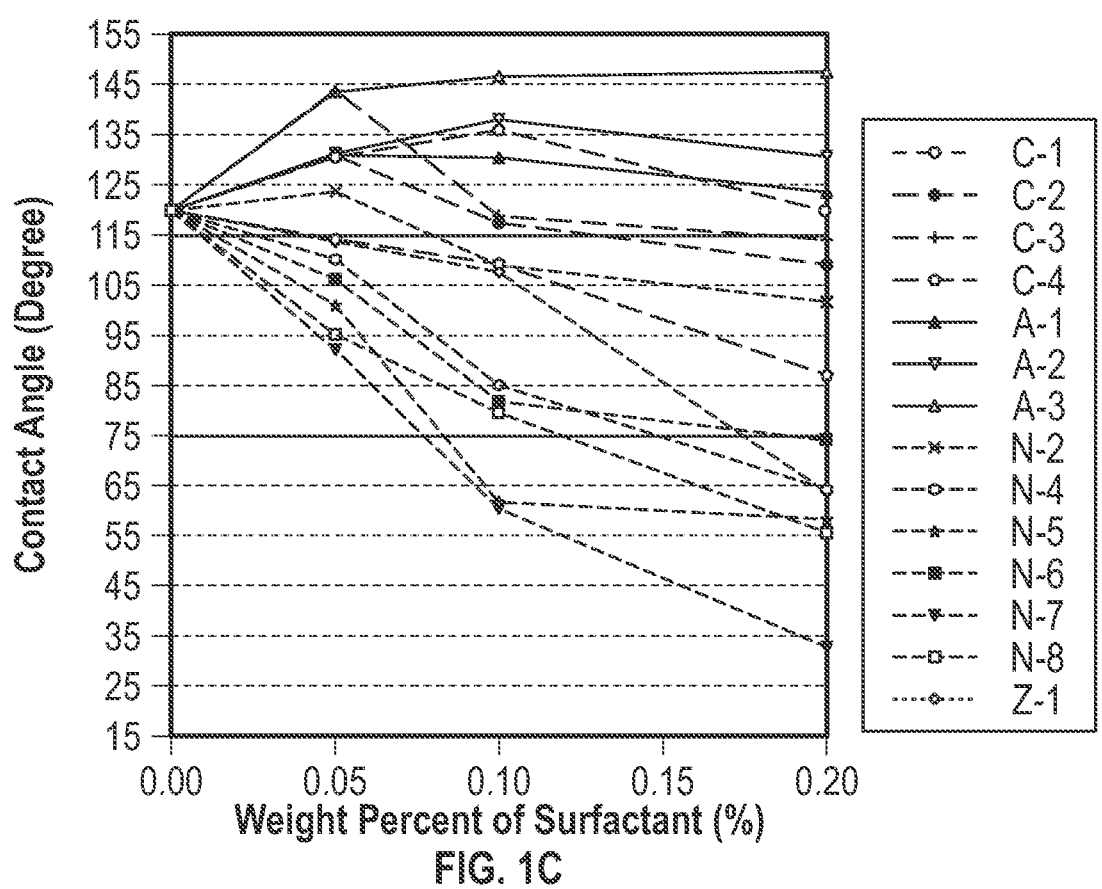

FIGS. 1A-1C illustrate graphs showing contact angle measurements of various surfactants according to one embodiment of the present disclosure. In particular, FIGS. 1A-1C illustrate contact angle measurements using DI water and Eagle Ford black oil showing high efficacy of nonionic surfactants (denoted N) and relative ineffectiveness of anionic and cationic surfactants (designated by A and C, respectively) in modifying Eagle Ford rock chips from oil-wet to water-wet. The structures of the surfactants displayed in FIGS. 1A-1C are illustrated below in Tables I and II. The test procedures and results therein are described in the following paragraphs.

The wettability of six cores from different depths of the Eagle Ford formation was studied. The retrieved cores were cut, cleaned, and then aged in crude oil for contact angle measurements. As is known in the art, the contact angle was measured (using a goniometer) in deionized water at 170° F. and recorded periodically throughout the aging process. Original wettability of the cleaned chips without oil saturation was in the water-wet region. The rock chips were then aged in a 24° API Eagle Ford crude oil for six weeks. During the aging process, the wettability of the rock chips was gradually altered to oil-wet. Presumably, wettability alteration was induced by the adsorption of polar (or polarizable) compounds within the crude oil. The crude oil had a low but measurable total acid number (TAN).

Ionic surfactants with differing polar head groups and nonpolar tails were tested. Table I below illustrates various ionic surfactants studied as part of the present disclosure for wettability alteration and spontaneous imbibition, and provides the nomenclature and structure for each of the structures.

TABLE I

| Surfactant | Type | Structure |
| --- | --- | --- |
| C-1 | Cationic | 2-C10 dimethyl ammonium chloride |
| C-2 | Cationic | C12 trimethyl ammonium chloride |
| C-3 | Cationic | C16 trimethyl ammonium chloride |
| C-4 | Cationic | C18 trimethyl ammonium chloride |
| A-1 | Anionic | C15-18 internal olefin sulfonate |
| A-2 | Anionic | C20-24 internal olefin sulfonate |
| A-3 | Anionic | C12-15 alcohol 13PO sulfate |
| Z-1 | Zwitterionic | C12-14 alcohol amidopropyl betaine |

A variety of ethoxylated nonionic surfactants were also studied and are illustrated below in Table II. They are characterized by the alcohol hydrophobe chain length and the average ethylene oxide (EO) chain length. Table II also lists the cloud point temperature of the surfactant (at 1 wt % surfactant concentration) in deionized (DI) water as well as a brine. For Table II, the cloud point temperature is measured at 1 wt % surfactant concentration. As illustrated, the surfactants in the brine solutions have lower cloud point temperatures.

TABLE II

| Surfactant | Type | Structure | Cloud Point ° F. in DI Water | Cloud Point ° F. in Brine |
| --- | --- | --- | --- | --- |
| N-1 | PAE | C12-13 alcohol + 2EO | <32 | <32 |
| N-2 | PAE | C9-11 alcohol + 8EO | 176 | 126 in 5% sodium sulfate |
| N-3 | GAE | C12 Guerbet alcohol + 9EO | 135 | 83 in 10% sodium chloride |
| N-4 | GAE | C12 Guerbet alcohol + 12EO | 187 | 129 in 10% sodium chloride |
| N-5 | PAE | C12-14 alcohol + 12EO | >212 | 154 in 10% sodium chloride |
| N-6 | PAE | C12-14 alcohol + 22EO | >212 | 200 in 6% sodium chloride |
| N-7 | NPE | C9 alkylphenol + 30EO | >212 | 167 in 10% sodium chloride |
| N-8 | NPE | C9 alkylphenol + 40EO | >212 | >167 in 10% sodium chloride |

First, the surfactants were pre-screened as a solution in deionized water. The CA measurements were performed at concentrations of 0.05 wt %, 0.10 wt %, and 0.20 wt % surfactant on select Eagle Ford rock chips. Multiple CA measurements were conducted on the same rock chip, and the reported CA values were averaged from all the measurements to minimize error. Surfactants with different head and tail groups were tested, and the results are shown in FIGS. 1A-1C. The results demonstrate that the electric charge or lack thereof of the surfactant head group has a significant effect on the performance of surfactant in wettability alteration. In other words, in one embodiment the use of nonionic surfactants provides increased wettability capabilities.

All three rock chips were observed to be more oil-wet with anionic surfactants compared to the initial wettability. For instance, the initial CA of chip 1-3 is about 106°, while the final CA with the anionic surfactant A-3 is large as 150° at the concentration of 0.20 wt %. Surfactant A-2 has the same head group as surfactant A-1 but a longer tail, leading to more oil-wet behavior than surfactant A-1. Cationic surfactants altered the chips to more oil-wet at the lower concentration (0.05 wt %), and more water-wet at the higher concentration (0.20 wt %). When the concentration is high, cationic surfactants with longer carbon chains generally show greater wettability alteration than cationic surfactants with shorter carbon chains. Nonionic surfactants with intermediate EO numbers (10-20) and large EO numbers (20-50) have high cloud points, which enables the CA to be measured at 170° F. These nonionic surfactants could effectively alter the wettability to water-wet at a concentration of 0.20 wt %. Surfactants with large EO numbers, such as surfactant N-6 and surfactant N-7, have better performance than surfactants with less EO numbers.

In addition to surfactant structure, the concentration of surfactant solution affects the final CA. As the surfactant concentration increases, the adsorption of surfactant molecules on the oil-water interface and the solid surface increases. CA with nonionic surfactant decreases monotonically with increased surfactant concentration. The lowest CA (greatest wettability alteration), about 18°, was achieved on the surface of chip 1-3 with 0.20 wt % surfactant N-8. With cationic surfactants, the rock surface was altered to more oil-wet at low surfactant concentration and more water-wet at high surfactant concentration.

Based on these test results, the final CAs of the chips are strongly affected by the initial CAs of the chips, and in most cases, the rock chip having a larger initial CA also leads to a larger final CA with the same surfactants. Based on the above observations, it can be concluded that nonionic surfactants generally lead to lower contact angles and thus more significant wettability alteration than ionic surfactants.

Spontaneous Imbibition

In one embodiment of the present disclosure, the use of nonionic surfactants provides increased oil recovery as opposed to ionic surfactants. In one embodiment of the present disclosure, spontaneous imbibition experiments (as described herein) can be utilized to verify the effectiveness of various surfactants and to determine the enhanced recovery factor for the nonionic surfactants disclosed herein.

Figure 2:
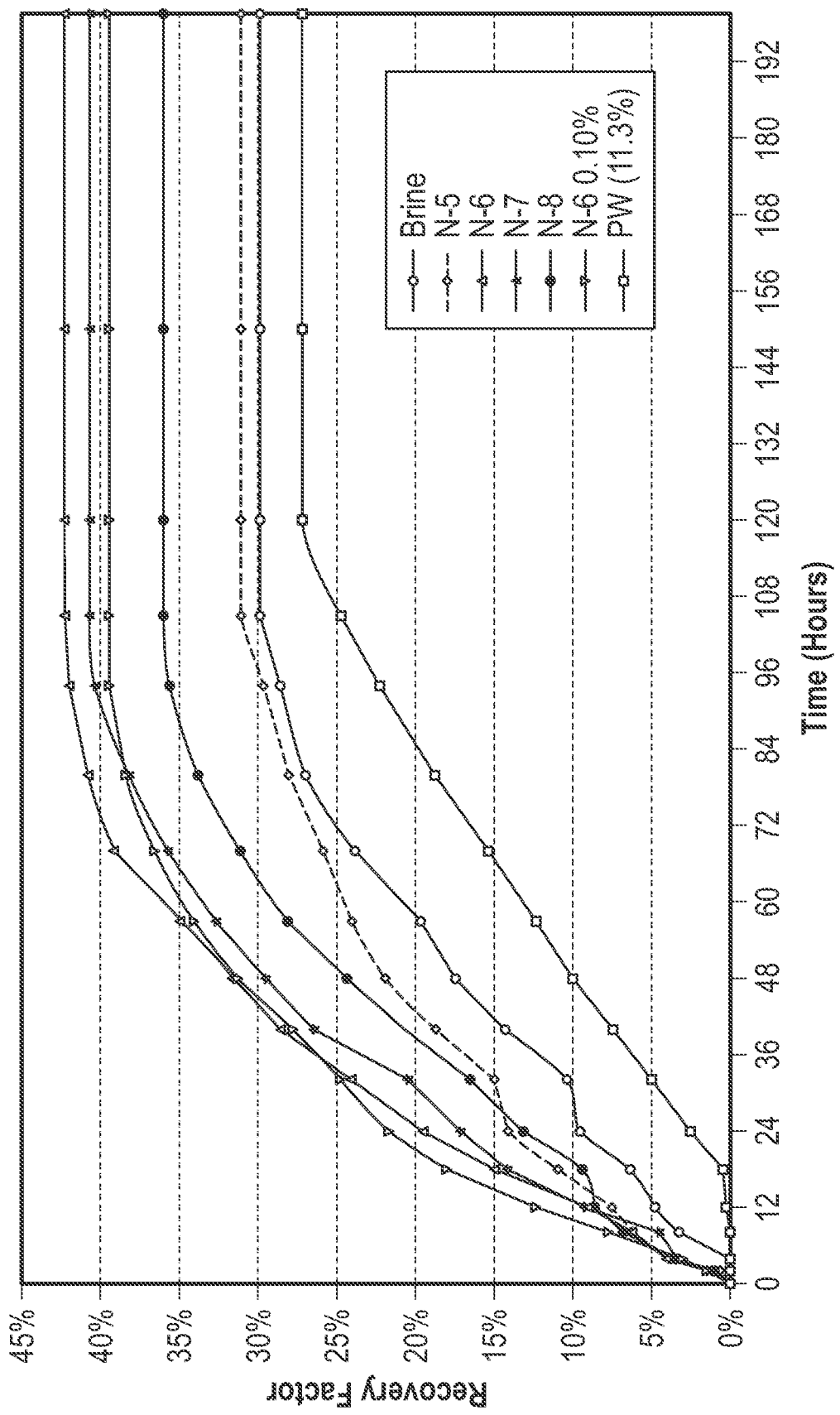
FIG. 2 illustrates oil production curves from spontaneous imbibition experiments according to one embodiment of the present disclosure.

The test procedures and results therein are described in the following paragraphs for spontaneous imbibition experiments. In one embodiment, these experiments were performed to address the validity of the previous findings in the Contact Angle (CA) tests and to qualitatively investigate the capability of select surfactants imbibing into unconventional liquid reservoir (ULR) cores. FIG. 2 illustrates oil production curves from these spontaneous imbibition experiments. In particular, FIG. 2 illustrates the results of spontaneous imbibition tests using nonionic alcohol ethoxylate surfactants showing increased recovery of Eagle Ford oil from core plugs versus that obtained from brine alone. As illustrated in FIG. 2, the base case (a brine solution with no surfactant) has a high contact angle, which results in a low recovery from spontaneous imbibition. As surfactant is added to the aqueous phase, imbibition is significantly improved.

In one embodiment, spontaneous imbibition experiments are performed by soaking a core plug taken from the reservoir rock in crude oil for a period of up to 3 months. Once the sample is fully saturated with oil, the plug is immersed in the aqueous phase that either contains surfactant or simply a brine solution to compare with a recovery factor from surfactant samples. For the test results described herein, aged cores from the Eagle Ford formation were immersed in aqueous solutions mixed with brines and the select surfactants. Seven cores retrieved from the top of the Eagle Ford interval and four cores from the bottom of the Eagle Ford interval were used for imbibition experiments.

The experimental temperature was set at the estimated reservoir temperature (which was set at 200° F.) and maintained based on placement of the samples in an oven during the testing. The volume of produced oil from the cores was measured by the use of Amott cells. As is known in the art, Amott cells are the cells where the oil saturated core plug is immersed in the aqueous phase. The volume was converted to a recovery factor by normalization to the initial oil volume. The Original Oil in Place (OOIP) in the cores was calculated by mass difference and density of oil at room temperature. The OOIP of the top seven core plugs is similar at approximately 1.65 cc. The porosity of these cores is around 5%, while the porosity of the plugs at the bottom of the Eagle Ford interval is lower. The measured OOIP of the bottom plugs is about half of the OOIP observed for plugs from the top of the interval.

As illustrated in FIG. 2, seven core plugs from the top Eagle Ford interval were utilized for the surfactant evaluation in the spontaneous imbibition experiments. The base case was the 50/50 brine (6%) with no surfactant and a corresponding CA of 106°. Results with surfactants were compared with the base case to assess the incremental oil recovery caused by surfactant additives. The produced water (PW) with a high salinity level was also tested to investigate the effect of salinity. Four nonionic surfactants (N5, N6, N7, and N8) with different EO numbers were tested at 0.20 wt % for their effectiveness of improving oil recovery. One experiment with surfactant N-6 at 0.10 wt % was performed to investigate the effect of surfactant concentration.

As illustrated in FIG. 2, oil recovery curves reached plateaus after four days of the imbibition process for all cases. For the base case scenario (brine only), about 30% of OOIP was produced, while the recovery factor for the DW case was lower than the brine case. Such results can be explained with the IFT measurement that brine has remarkable IFT reduction and promotes high oil relative permeability. IFT of oil and water in brine was about half of the IFT in DW. As is known in the art, Interfacial Tension (IFT) is determined by the pendant drop method. Wettability of rock surface was slightly altered to more water-wet compared to initial condition as well. CA decreased by approximately 15° in the 6% brine compared to DW. The rock surface is more oil-wet in the PW than the 6% brine according to the previous CA measurements. This result addresses the importance of the dilution of produced water with freshwater.

In one embodiment, adding a nonionic surfactant into the aqueous phase produces higher oil recovery. The highest ultimate oil recovery was achieved by using surfactant N-6, which is 42% of OOIP. Half of the oil production was during the first day, and 30% of OOIP was recovered within the first two days. Based on these results, more EO groups attached to the surfactant head does not result in greater recovery. This indicates that the EO group is most favorable in a certain range and surfactant N-6 has the optimum molecular structure for this particular oil/water/rock system tested.

Surfactant N-6 (C1214 EO22 alcohol ethoxylate) was also tested at a lower concentration. The final recovery factor is lower than the higher concentration test. Experimental results demonstrate that a higher concentration of surfactants leads to larger oil-water IFT reduction, more significant wettability alteration, and higher ultimate oil recovery. An optimum concentration could be determined considering the balance of the production and the cost.

In summary, nonionic alcohol ethoxylate surfactants are more effective than anionic or cationic surfactants at increasing low-TAN black oil recovery from a carbonate-rich core through imbibition. Due to the reduction in solubility of AE at increasing temperatures and salinity which can eventually result in phasing out of the surfactant from solution and impeding surfactant mass transfer to the reservoir matrix, the cloud point temperature of the surfactant in reservoir brine must be higher than the reservoir temperature. However, maintaining the proximity of the surfactant cloud point to the reservoir temperature results in the maximum surface activity of the surfactant, increased adsorption, and better imbibition performance.

Mechanism of Wettability Alteration

Figure 3A:
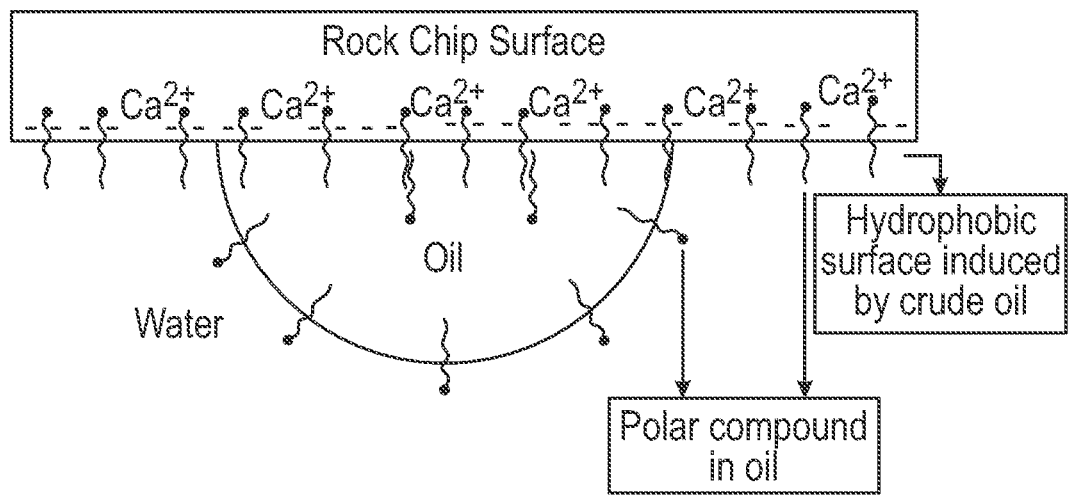
FIGS. 3A and 3B illustrate possible contact angle modification on the rock surface based on the use of a nonionic surfactant according to one embodiment of the present disclosure.
Figure 3B:
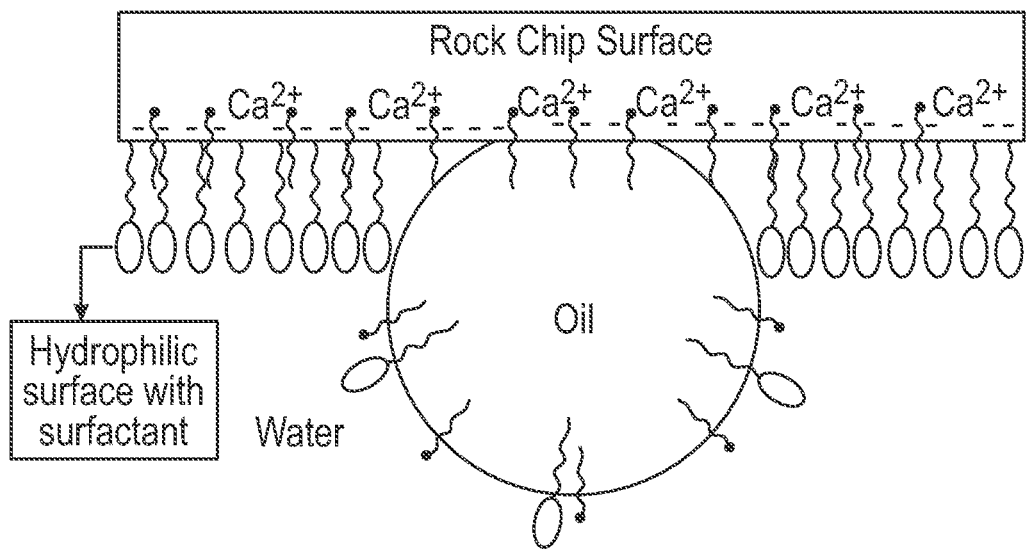

In one embodiment, the beneficial effects of being near but below the surfactant cloud point temperature may be understood by general mechanistic theories. While the described mechanistic theories illustrate one potential chemistry theory as to how the nonionic surfactants affect the wettability of a surface, the present disclosure and the invention described herein is not limited to just this theory. While there are varying theories as to the actual mechanism of wettability alteration by nonionic surfactants on a calcite rock surface, one potential mechanism is depicted in FIGS. 3A and 3B. FIG. 3A illustrates a rock surface without the presence of surfactant, while FIG. 3B illustrates a rock surface in the presence of a nonionic surfactant. FIGS. 3A and 3B illustrate possible contact angle modification on the rock surface based on the use of a nonionic surfactant as described herein. In particular, in FIG. 3A, adsorptive components from oil interact with the positively charged calcite causing oil-wetting conditions allowing oil to spread, and in FIG. 3B, surfactant tails interact by hydrophobic mechanism with crude oil molecules on the rock surface allowing the hydrophilic head group to orient away from the surface thereby creating water attraction, and oil repulsion. As illustrated in these figures, any oil within the rock is more easily obtained and/or retrieved based on the use of and interactions with the surfactant.

When calcite reservoir rock is exposed to crude oils containing high molecular weight resins, asphaltenes, and/or organic acids, the rock surface becomes oil wet due to adsorption of those species. Upon exposure to a micellar solution of alcohol ethoxylate and the associated low level of monomeric surfactant species, the individual surfactant molecules diffuse to the surface to interact with the adsorbed oil species through hydrophobic interactions leaving the surfactant hydrophile on the outside of the surface layer. This modification then leads to partial roll-up of the crude oil as water penetrates as a surface layer under the oil. Others have proposed that nonionic surfactants penetrate the adsorbed oil layer through defects in that layer resulting in a coating and in EO groups of surfactant oriented towards the aqueous phase. The rock surface is altered to hydrophilic or water-wet by the adsorbed surfactant layer. The surface tension of oil and the rock is large due to the repulsive forces between the oil droplet and the hydrophilic surface. The oil droplet thus prefers to maintain its spherical shape on the rock surface, and thus contact angle is smaller than ninety degrees. It is in this configuration that oil permeability and oil production is enhanced within a previously oil-wet reservoir matrix.

According to the Young-Laplace equation, the contact angle is also influenced by the brine-oil interfacial tension. Incorporating surfactants lowers this interfacial tension value and promotes either spreading oil on the rock surface or roll-up of the oil from the rock surface. However, whether the rock surface is characterized as water-wet or oil-wet is still governed by the rock-liquid surface tension.

To obtain the lowest possible contact angle of oil on the rock surface, it is advantageous for the surfactant molecules to have a strong affinity for the rock surface and oil-brine interface. For nonionic surfactants, these conditions are achieved when the surfactant solution is maintained as close to the cloud point as practically possible without inducing phase separation. This high surface activity near the cloud point is a well-known attribute of nonionic alcohol ethoxylates and is utilized to optimize their performance in numerous applications such as hard surface cleaning and laundry detergency. However, it must be noted that the adsorption process is reversible if conditions are allowed to move away from the cloud point, such as when temperature and/or salinity is reduced, or when surfactant concentration in the surrounding aqueous phase is reduced. It is therefore important to understand how persistent the wettability alteration is in the reservoir rock matrix.

Single Well Injection Test Results

In one embodiment, the beneficial effects of being near but below the surfactant cloud point temperature may be understood by various injection tests, such as those disclosed herein, demonstrating the long-lasting effects of the disclosed surfactant.

Figure 4:
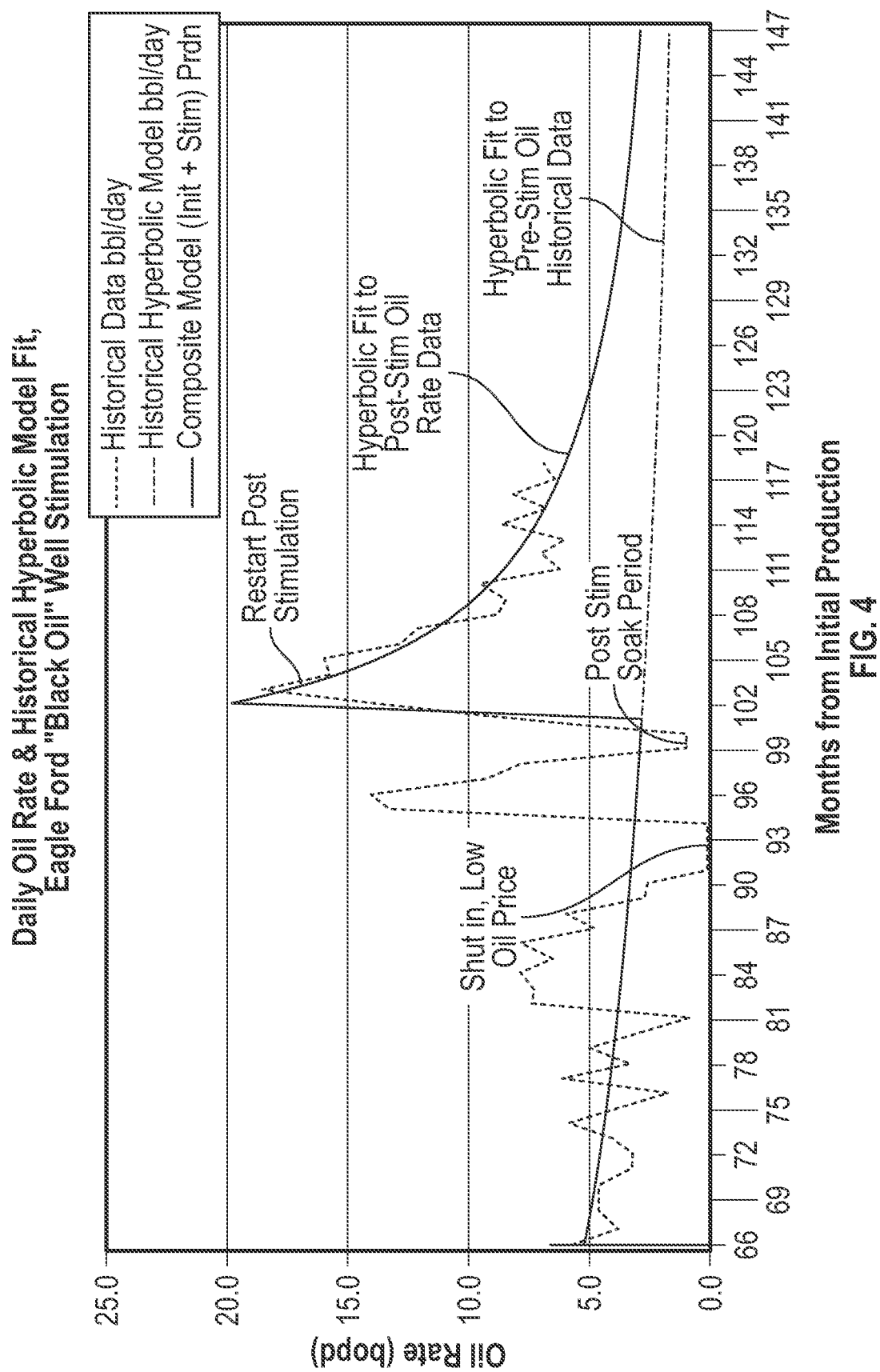
FIG. 4 illustrates a chart showing results of a stimulation test using a surfactant according to one embodiment of the present disclosure.

FIG. 4 illustrates a chart showing stimulation results demonstrating increased oil production using a surfactant disclosed herein. For the tests shown in FIG. 4, 12,300 barrels of the optimum nonionic alcohol ethoxylate surfactant N-6 system from lab screening testing (C12-14 22EO alcohol ethoxylate) was injected into an Eagle Ford well at 0.2 wt % in 2% TDS brine, and shut-in for one month before production was resumed. The cloud point temperature of the injection solution was approximately 10° F. over the estimated well bottom-hole temperature of 200° F. As illustrated in FIG. 4, a long-lasting enhancement of oil production over the pre-stimulation oil rate trend was observed. Long-term oil production rate data for the well was fit to a hyperbola, and that curve provides the expected oil rate trend in the absence of stimulation. The data demonstrates a significant increase in oil rate relative to the rate expected based on the fit of historical, pre-stimulation data.

All of the methods disclosed and claimed herein can be made and executed without undue experimentation in light of the present disclosure. While the methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed surfactants and components may be eliminated or substituted for the components described herein where the same or similar results would be achieved. All such similar substitutes and modifications apparent to those skilled in the art are deemed to be within the spirit, scope, and concept of the invention.

Many other variations in the system are within the scope of the invention. For example, the surfactant temperature may be at the cloud point temperature, near the cloud point temperature, below the cloud point temperature, or significantly less than the cloud point temperature. A contact angle of the surfactant solution may be less than 75 degrees, less than 60 degrees, or less than 45 degrees. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A method of injecting surfactants into an oil well, comprising:
   injecting a non-ionic surfactant solution into a reservoir formation, wherein the non-ionic surfactant solution comprises one or more non-ionic surfactants dissolved in a brine solution, wherein the surfactant solution exhibits a cloud point temperature in formation brine that is greater than but within 20 degrees Fahrenheit of the temperature of the reservoir formation; and
   altering the wettability of a rock surface of a reservoir rock core sample from the reservoir formation to be water wet based on the injected surfactant solution, wherein the water-wet rock surface is indicated by a contact angle measurement at reservoir temperature of a reservoir oil droplet on the rock surface of less than 75° as measured through the non-ionic surfactant solution.

2. The method of claim 1, wherein the brine composition comprises a salt composition substantially similar to a salt composition of the formation brine.

3. The method of claim 1, wherein the brine composition comprises substantially no surfactants.

4. The method of claim 1, further comprising selecting the non-ionic surfactant solution based upon the reservoir temperature.

5. The method of claim 1, further comprising determining the reservoir temperature and selecting the non-ionic surfactant solution based upon the determined reservoir temperature.

6. The method of claim 1, further comprising creating the non-ionic surfactant solution based upon the reservoir formation.

7. The method of claim 1, wherein the nonionic surfactant solution comprises an ethoxylated nonionic surfactant.

8. The method of claim 1, wherein the nonionic surfactant solution comprises a primary alcohol ethoxylate.

9. The method of claim 1, wherein the nonionic surfactant solution comprises a secondary alcohol ethoxylate.

10. The method of claim 1, wherein the nonionic surfactant solution comprises a Guerbet alcohol ethoxylate.

11. The method of claim 1, wherein the nonionic surfactant solution comprises an alkylphenol ethoxylate.

12. The method of claim 1, wherein the nonionic surfactant solution comprises an alkylpolyglucoside surfactant.

13. The method of claim 1, wherein the nonionic surfactant solution comprises one or more anionic hydrotropes.

14. The method of claim 1, wherein the nonionic surfactant solution comprises one or more nonionic hydrotropes.

15. The method of claim 1, wherein the nonionic surfactant solution comprises at least 0.2 wt % surfactant of the injected brine composition.

16. The method of claim 1, wherein the nonionic surfactant solution comprises less than 0.2 wt % surfactant of the injected brine composition.

17. The method of claim 1, wherein the nonionic surfactant solution comprises less than 0.5 wt % surfactant of the injected brine composition.

18. The method of claim 1, wherein the nonionic surfactant solution comprises between 0.2 wt % and 0.5 wt % surfactant of the injected brine composition.

19. The method of claim 1, wherein the nonionic surfactant solution comprises greater than 0.5 wt % surfactant of the injected brine composition.

20. The method of claim 1, wherein the nonionic surfactant solution produces a final contact angle of less than 75°.

21. The method of claim 1, wherein the nonionic surfactant solution produces a final contact angle of less than 60°.

22. The method of claim 1, wherein the nonionic surfactant solution produces a final contact angle of less than 45°.

23. The method of claim 1, wherein the reservoir temperature is approximately the same as the cloud point temperature.

24. The method of claim 1, wherein the reservoir temperature is less than 5 degrees Fahrenheit below the cloud point temperature.

25. The method of claim 1, wherein the reservoir temperature is less than 10 degrees Fahrenheit below the cloud point temperature.

26. The method of claim 1, wherein the reservoir formation comprises an oil-wet unconventional reservoir formation.

27. The method of claim 1, wherein the injection step produces spontaneous brine imbibition from the reservoir formation.

28. The method of claim 1, wherein the reservoir formation comprises carbonate-rich rock.

29. The method of claim 1, wherein the reservoir formation comprises silicate-rich rock.

30. The method of claim 1, wherein the contact angle is measured at a given temperature.

31. The method of claim 1, wherein the reservoir rock is saturated with oil prior to contact angle measurements.

32. The method of claim 1, wherein the reservoir rock is conditioned to simulate reservoir formation conditions prior to contact angle measurements.

33. The method of claim 1, wherein the reservoir rock is a restored state sample of a reservoir rock.

34. The method of claim 1, wherein the nonionic surfactant solution reduces a contact angle at reservoir temperature between a reservoir oil droplet and the rock surface from above 105° to below 60°.

35. The method of claim 1, wherein the nonionic surfactant solution reduces a contact angle at reservoir temperature between a reservoir oil droplet and the rock surface from above 105° to below 45°.

36. The method of claim 1, wherein the brine salinity of the injected non-ionic surfactant solution is a lower salinity than the formation brine of the reservoir formation.

37. The method of claim 1, wherein the brine salinity of the injected non-ionic surfactant solution is less than half of the salinity of the formation brine of the reservoir.

38. The method of claim 1, wherein the brine salinity of the injected non-ionic surfactant solution is less than one-quarter of the salinity of the formation brine of the reservoir.

39. A method of injecting surfactants into an oil well, comprising:
   estimating a temperature of a reservoir formation;
   injecting a nonionic surfactant solution into the reservoir formation, wherein the temperature of the reservoir formation is at or less than the cloud point temperature of the surfactant solution in formation brine; and
   altering the wettability of a rock surface of a reservoir rock core sample from the reservoir formation to be water wet based on the injected surfactant solution, wherein the water-wet rock surface is indicated by a contact angle measurement at reservoir temperature of a reservoir oil droplet on the rock surface of less than 75° as measured through the non-ionic surfactant solution.

40. The method of claim 39, further comprising determining the surfactant solution based on the temperature of the reservoir formation.

41. The method of claim 39, wherein the estimating a temperature of the reservoir formation step is based on bottom hole temperature measurements of the oil or gas well.

* * * * *